(12) United States Patent
Timtner (10) Patent No.: US 9,809,394 B2
(45) Date of Patent: Nov. 7, 2017

(54) TORQUE-LIMITING RETURN STOP DEVICE

(71) Applicant: RINGSPANN GmbH, Bad Homburg (DE)

(72) Inventor: Karlheinz Timtner, Bad Homburg (DE)

(73) Assignee: RINGSPANN GmbH, Bad Homburg (DE)

( * ) Notice: Subject to any disclaimer, the term of this patent is extended or adjusted under 35 U.S.C. 154(b) by 34 days.

(21) Appl. No.: 14/635,216

(22) Filed: Mar. 2, 2015

(65) Prior Publication Data

US 2015/0251856 A1    Sep. 10, 2015

(30) Foreign Application Priority Data

Mar. 7, 2014   (DE) ................ 10 2014 204 174

(51) Int. Cl.
| | |
|---|---|
| *F16D 41/04* | (2006.01) |
| *B65G 43/06* | (2006.01) |
| *B65G 23/26* | (2006.01) |
| *F16D 7/02* | (2006.01) |
| *F16D 41/06* | (2006.01) |

(52) U.S. Cl.
CPC ............ *B65G 43/06* (2013.01); *B65G 23/26* (2013.01); *F16D 7/025* (2013.01); *F16D 41/06* (2013.01)

(58) Field of Classification Search
CPC ......... B65G 43/06; B65G 23/26; F16D 7/025; F16D 41/06
USPC ........ 464/46–48; 198/832.2; 192/48.92, 55.1
See application file for complete search history.

(56) References Cited

U.S. PATENT DOCUMENTS

| 4,425,989 A | 1/1984 | Gotoda | |
|---|---|---|---|
| 4,548,316 A | 10/1985 | Maurer | |
| 6,554,113 B2 * | 4/2003 | Li | ............ F16D 7/027 |
| | | | 192/48.92 X |
| 7,987,960 B2 * | 8/2011 | Stoltze | ........... B65G 23/26 |
| 2013/0161151 A1 | 6/2013 | Brzus | |

FOREIGN PATENT DOCUMENTS

| DE | 3112532 | 12/1981 |
|---|---|---|
| DE | 3245347 | 5/1983 |
| DE | 19620131 | 11/1997 |
| DE | 10313572 | 10/2004 |

(Continued)

*Primary Examiner* — Gregory Binda
(74) *Attorney, Agent, or Firm* — Volpe and Koenig, P.C.

(57) ABSTRACT

A return stop device with a freewheel having an internal ring, an external ring, and retaining elements arranged in an annular gap therebetween. A flange is provided at the attachment side and a housing part, between which the external ring is clamped, and a clamping device by which the external ring is pressed with its face between the flange and the housing part against a friction area, in order to generate a friction-fitting connection between the flange and the external ring. A release device is provided to at least partially overcome the contact pressure, in order to reduce or remove the friction-fitting connection. The release device includes an actuating organ, which acts upon a first gliding element, displaceable in an operating direction, to act upon a second gliding element, arranged displaceable perpendicular to the operating direction, that acts via a second wedge against the contact pressure upon the housing part.

14 Claims, 10 Drawing Sheets

(56) References Cited

FOREIGN PATENT DOCUMENTS

| DE | 102011122006 | 6/2013 |
| DE | 102013003954 | 9/2014 |
| JP | S57187197 | 11/1982 |
| JP | S59114208 | 7/1984 |
| JP | H05306725 | 11/1993 |
| JP | H06001861 | 1/1994 |

\* cited by examiner

TORQUE-LIMITING RETURN STOP DEVICE

INCORPORATION BY REFERENCE

The following documents are incorporated herein by reference as if fully set forth: German Patent Application No. 102014204174.0, filed Mar. 7, 2014.

BACKGROUND

The present invention relates to a torque-limiting return stop device, which comprises a freewheel with an internal ring, an external ring concentric in reference thereto, and several retaining elements arranged in an annular gap between the internal and the external ring, which permit a relative rotation between the internal and the external ring in one direction, and block it in the other direction in a form-fitting or friction-fitting fashion, with the return stop device additionally comprising a flange at the attachment side and a housing part, between which the external ring can be interlocked, as well as a clamping device acting in the axial direction, which applies a contact pressure, preferably an adjustable one, by which the external ring is pressed with its face against at least one friction area between the flange and the housing part in order to generate a friction-fitting connection between the flange and the external ring, and with the return stop device furthermore comprising at least one releasing device, which is embodied to at least partially overcome the contact pressure of the clamping device in order to reduce or release the friction-fitting connection.

A generic return stop device is described for example in the product specification sheets in the catalog 84, issue 2013/2014, pages 72 to 75 of the applicant. This describes the attachment of freewheels of the series FXRV and FXRT, which description is included in its entirety herein by reference as if fully set forth.

Conveyer systems of most various types are very important for the infrastructure everywhere. Conveyer systems with continuous conveyance represent a considerable portion of these conveyer systems. They can reach a length of conveyance extending over many kilometers with mass flows totaling several ten thousand tons per hour and conveyance heights of several hundred meters.

When continuous conveyer systems are used for conveying items to different elevations, particularly in case of upwards conveying diagonal conveyer systems, safety measures must be implemented to prevent that, driven by the weight of the goods being conveyed, the continuous conveyer system tries to run backwards when an interruption occurs in the drive train. For this purpose return stop devices are used. They operate fully automatically and immediately prevent the downwards motion of the conveyer belt without here any relevant reverse motion developing and only minor kinetic energy being generated in the system.

When in continuous conveyer systems with several drive units multiple drives are provided, each with a separate return stop device, in case of a malfunction of the drive the problem arises of an uneven distribution of the reverse torque upon the individual transmissions and return stop devices. When the system is idle, the entire reverse torque initially acts primarily only upon one return stop device, due to the different play and elasticity of the drives involved. The return stop devices are equipped with torque limiters in order to prevent impermissible torque peaks from leading to the destruction of individual transmissions and corresponding return stop devices, which can progress up to major damage of the entire conveyer system.

The torque limiter installed in a return stop device permits a brief reverse motion of the drive shaft that is connected to the return stop device, amounting to only a few angular degrees, when the predetermined slippage torque has been exceeded, until successively the other return stop devices engage. This achieves that the entire reverse torque of the conveyer system is rather evenly distributed over the individual return stop devices and transmissions. Additionally, the dynamic torque peaks of the blocking operation are reduced such that the transmissions are protected from damaging torque peaks. Accordingly, by using torque limiters in connection with multiple drive units, the transmissions used can be dimensioned smaller.

In order to allow a limited reverse motion of the conveyer system when malfunctions occur in the drive, jamming at the conveyer belt etc., the return stop devices may be equipped with controlled release devices. Such a release device may for example be embodied such that it at least partially overcomes a contact pressure, by which the friction-fitting connection is generated in the torque limiter, in order to this way allow a controlled slippage of the torque limiter even below the predetermined maximum torque, for example during maintenance tasks. In release devices of prior art this occurs via large release screws.

The attachment of return stop devices occurs usually at a reduction gear unit on a fast-running shaft in order to operate at a speed as high as possible and thus correspondingly with smaller torques. Such transmissions are today increasingly designed in a more compact fashion and yet they can transmit increasing forces, so that stronger return stop devices become necessary. Due to the fact that the external diameter of the return stop device is limited by the dimensions of the transmission housing and the shaft distances though, it must be designed in a more compact fashion as well. Since a limiting of the torque is achieved in the torque limiter by way of friction-fitting connections, and the slippage torque is adjusted by an appropriate adjustment of the pressure upon the area, here a higher maximum torque with simultaneously a more compact design can only be achieved by an increase of the contact pressure in the torque limiter. However, this leads on the one side to the necessity of a higher number of release screws to overcome the contact pressure. This is however disadvantageous, because the release must occur very quickly, when required, therefore the number of release devices should be as low as possible.

SUMMARY

The object of the invention is therefore to provide a torque-limiting return stop device with a release device, which on the one hand is designed in a more compact fashion and on the other hand can be configured for higher slippage torque.

The objective is attained with a device having one or more features of the invention. Advantageous embodiments are discernible from the description and claims.

In a generic return stop device this objective is attained in that the release device has an actuating organ, which acts upon a first gliding element, which is displaceable in an operating direction, that the first gliding element via a first wedge area acts upon at least one second gliding element, which is arranged displaceable essentially in a direction perpendicular to the operating direction, and that the second gliding element acts via a second wedge area upon the housing part opposite the contact pressure.

The dual wedge effect achieved in this fashion and the two-fold amplification of force resulting therefrom allows for the application of very strong release forces, acting opposite the contact pressure, in order to reduce or cancel the friction-fitting connection between the external ring of the return stop device and the flange at the attachment side. This allows a targeted reverse motion of the conveyer belt, for example.

The release device designed in this fashion allows to size the clamping device such that considerably stronger contact pressures can be adjusted. This is advantageous, because in return stop devices of prior art the maximal nominal torque of the freewheel could not be fully utilized by far, because the maximally achievable slippage torque, dependent on the contact pressure, was restricted by the torque limiter. Ideally the maximum slippage torque and the nominal torque of the return stop device should be similar. This allows an optimally adjusted sizing for the required application and thus considerably smaller designs of the torque-limiting return stop device with regards to the external diameter.

In order to allow a contact pressure as high as possible, the friction areas, against which the external ring of the return stop device is pressed in order to generate a friction-fitting connection to the flange at the attachment side, are provided with a friction coating, which can transfer appropriately strong friction forces occurring under load and thus show a relatively high resistance to wear and tear. Preferably a carbon-coating is used for this purpose. This allows an eight to ten-fold stronger contact pressure than used in conventional coatings, so that the contact can be dimensioned appropriately stronger and thus the return stop devices can be sized accordingly with smaller dimensions.

In order to generate the desired strong contact pressure, for example one or more disk springs may be used, which are stressed via connection screws, by which the housing part is held against the flange with here the external ring being pressed against said flange. In one preferred embodiment the disk springs are held via the cap ring about the housing part and press it against the flange.

The use of disk springs proves particularly beneficial because they are capable at small installation spaces to apply considerably stronger forces than the helical compression springs frequently used in prior art.

Alternatively, within the scope of the invention however a plurality of helical compression springs may be used as well, which are stressed via connection screws, by which the housing part is held against the flange and here the external ring of the return stop device is pressed against said flange.

Preferably release screws can be used as actuating organs of the release device. Release screws are easy to operate by the user and can be realized with simple technology. It is particularly advantageous that simple, easily accessible tools commonly present on construction sites can be used. Additionally, release screws allow a fine-tuned and gradual manual release on the none-return device by the maintenance personnel. An arrangement is particularly advantageous and thus preferred, in which the release screws are fastened in the housing part and are supported at the flange, because this way the axial force acting in the screw supports the release of the return stop device.

When the release screw is additionally spring-loaded in reference to the clamping device, for example via a set of small disk springs located about the release screw, the release device can be operated in an even more sensitive and fine-tuned fashion, so that for example a targeted, gentle reverse motion of a conveyer system can be implemented.

Alternatively, the actuating organ may however also include a hydraulic actuating device, for example in the form of an appropriate hydraulic cylinder.

In principle the release device according to the invention may be realized by a first gliding element with a wedge-shaped approach area, for example a wedge slider, which acts upon a single second gliding element, also embodied in a wedge or wedge-segment like shape. Here it is essential that by the two gliding elements, which can be displaced in reference to each other, a two-fold wedge amplification is yielded of the release force applied by the release device and acting opposite the contact pressure. The wedge angle beneficially ranges from approximately 15° to approximately 30°. This way, on the one hand the goal of a very compact design is achieved, and on the other hand also a minimum number of release devices necessary.

If the wedge areas or at least one of them are additionally provided with a friction reducing coating, even smaller wedge angles amounting to 10° for example may be used, which allow an even more beneficial force amplification without here any self-jamming occurring between corresponding wedge areas. By such a friction-reducing coating, e.g., using molycote-containing lubricants or by molybdenum-disulfide coatings, the friction value can be lowered considerably below the value of 0.1 typically occurring in steel.

In a particularly preferred embodiment the first gliding element comprises two symmetrically arranged first wedge areas, which act against two second gliding elements, in order to push them apart when actuated. By such a "dual wedge slider", based on the symmetrical design, the force deflection is improved and friction loss is reduced.

The first gliding element may here exhibit a symmetrical wedge shape and be arranged such that it pushes the two gliding elements apart when by the actuating organ it is pressed in the pressure direction between the two second gliding elements. Alternatively the first gliding element may also exhibit a symmetrical form, showing an inverse wedge-segment shape, and can be pulled by the actuating organ in the tensile direction against the second gliding elements, in order to push them apart.

In order to allow an actuation as simple as possible and a dependable release here preferably three or more release devices of the above-described type are arranged distributed in the circumferential direction. The use of three release devices, which are arranged along the circumference offset by 120° each, is here particularly preferred.

In order to prevent any forbidden and/or unintentional operation of the release device, here a safety device may be provided, which intentionally must be adjusted or removed prior to activating the release device. In case of a release screw the safety device may include for example a locking plate with a blind hole open towards one side, which is pushed like a spacer under the screw head of the release screw in order to this way prevent driving in said release screw. Such a locking plate may additionally be secured via a safety screw from falling out or being unintentionally removed.

BRIEF DESCRIPTION OF THE DRAWINGS

In the following, additional features, advantages, and characteristics of the present invention are explained based on the figures and based on exemplary embodiments. Shown are.

DETAILED DESCRIPTION OF THE PREFERRED EMBODIMENTS

Figure 1:
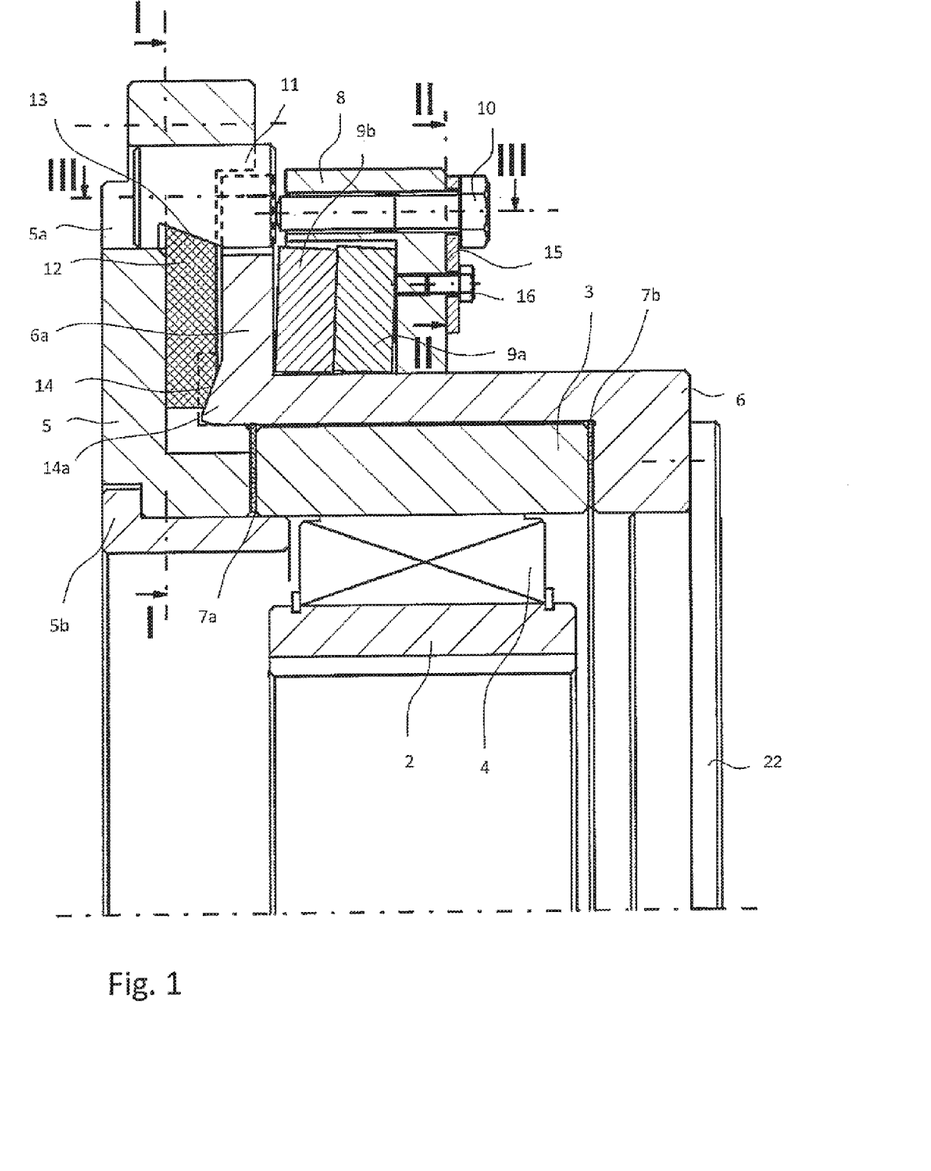
FIG. 1 a longitudinal cross-section through the upper half of a return stop device according to the invention in a first exemplary embodiment, FIG. 2 a cross-section along the line I-I in FIG. 1, FIG. 2A a schematic view showing three release devices offset by 120°, FIG. 3 a cross-section in the circumferential direction along the line III-III in FIG. 1, FIG. 4 an illustration of a detail of a release device of the return stop device shown in FIG. 1 in a longitudinal cross-section, FIG. 5 a cross-section through the illustration of a detail of FIG. 4 in a radial plane along the line V-V in FIG. 4, FIG. 6 an illustration of a detail of a safety device of the return stop device in a cross-section along the line II-II in FIG. 1, FIG. 7 a longitudinal cross-section through the upper half of the return stop device according to the invention in a second exemplary embodiment, FIG. 8 a cross-section along the line VI-VI in FIG. 7, FIG. 9 a cross-section in the circumferential direction along the line VII-VII in FIG. 7, FIG. 10 a longitudinal cross-section through the upper half of a return stop device according to the invention in a third exemplary embodiment, FIG. 11 a cross-section along the line IX-IX in FIG. 10, FIG. 12 a cross-section in the circumferential direction along the line VIII-VIII in FIG. 10, and FIG. 13 an alternative embodiment of the release device of FIG. 12.

A torque-limiting return stop device according to the prevent invention is formed by a freewheel, which is held in a friction-fitting fashion against a flange at the attachment side. A first exemplary embodiment of such a return stop device is shown in FIG. 1. Here only the upper half of the return stop device is shown in a longitudinal cross-section.

The freewheel includes an internal freewheel ring 2, which is assembled in a form-fitting fashion, for example via a key, to a shaft (not shown). An external freewheel ring 3 is arranged concentrically about the internal freewheel ring 2, with a freewheel cage with a plurality of retaining elements 4 being located in an annular gap between the internal freewheel ring 2 and the external freewheel ring 3, following each other. Such retaining elements may for example represent clamping rolls, clamping bodies, or blocking links, which are arranged in a known fashion such that they permit a relative rotation between the internal ring 2 and the external ring 3 in one direction and block it in the other direction in a form-fitting or friction-fitting fashion.

In this context, a multi-part ring, particularly divided into several axially adjacent partial rings, may also be considered an external freewheel ring 3, as described in DE 10 2011 122 006, with here additional friction disks or friction coatings potentially being arranged like a multi-disk clutch between the partial rings arranged axially adjacent.

At the attachment side, the return stop device comprises a flange 5, against which the external freewheel ring 3 is held by a housing part 6 in a friction-fitting fashion. For this purpose, the flange 5 comprises a contact area covered with a friction coating 7a, against which the face of the external freewheel ring is pressed at the flange side. The housing part 6 is shaped like a cup so that the freewheel is received therein. A radially extending internal area of the housing part 6 serves as a contact area for the face of the freewheel ring 3, facing away from the flange 5, and is also provided with a friction coating 7b. Particularly carbon-based coatings are suitable as friction coatings 7a, 7b, because they allow a very strong contact pressure, exhibit sufficiently high friction values, and also operate nearly without any wear and tear, even under high stress due to pressure.

At its side open towards the flange 5 the cup-shaped housing part 6 comprises an annular projection 6a, pointing radially outwardly, with a cap ring 8 placed around it, which stresses the housing part 6 via two disk springs 9a, 9b, without the invention here being limited to this number, against the flange 5 and here clamps the external freewheel ring 3 between the friction coatings 7a, 7b at the face. The cap ring 8 is connected to the flange 5 via a plurality of connection screws, distributed in the circumferential direction, which are not visible in the cross-section shown in FIG. 1. By the appropriate selection of the tightening torque of the connection screws the preliminary stress of the disk springs 9a, 9b and thus also the contact pressure can be precisely adjusted, by which the external freewheel ring 3 is clamped between the friction coatings 7a, 7b. The contact pressure in turn determines the slippage torque of the return stop device, and once it is exceeded the friction-fitting connection between the flange 5 and the external freewheel ring 3 is overcome and the freewheel therefore can slip in the blocking direction in reference to the flange 5 assembled in a torque-proof fashion.

At its face pointing away from the flange 5 the housing part 6 is closed via a lid 22. Additionally, a gasket is provided between the flange 5 and the housing part 6, not shown in greater detail in the figures, so that the freewheel is encased and/or encapsulated inside the housing part 6, sealed from dust and dirt. A bearing socket 5b is located inside the flange 5, which centers the external freewheel ring 3 on the flange 5.

The use of one or more disk springs 9a, 9b, which are stressed via a cap and/or fastening ring 8 against the flange 5, allows an extremely simple and reliable construction, which can be assembled with little assembly expense and allows here very high compression forces.

FIG. 1 furthermore shows a release device according to the invention, which in addition to a release screw 10 comprises a slide cylinder 11 and a gliding element 12, radially displaceable in a recess between the flange 5 and the housing part 6. The slide cylinder 11 is supported in a bore 5a of the flange 5 in a fashion displaceable in the axial direction. The cap ring 8 has a bore with an internal thread, in which the release screw 10 is inserted. When the release screw 10 is driven further in the direction of the flange 5 in order to release the return stop device, it presses upon the face of the sliding cylinder 11 and displaces it further into the bore 5a of the flange 5. Instead of a bore 5a, of course a prismatic opening, for example, and an appropriately formed gliding element 11 may be provided, with it being possible to produce a cylindrical bore in a particularly simple and cost-effective fashion and therefore this embodiment being preferred.

The sliding cylinder 11 comprises a milled slot, which serves as a wedge-shaped thrust surface 13 for the gliding element 12. When the gliding cylinder 11 is moved towards the left in FIG. 1, the wedge area 13 presses the gliding element 12 radially inwardly between the flange 5 and the housing part 6. The gliding element 12 comprises a second wedge area 14, which presses against an appropriate projection 14a of the housing part 6. When the gliding element 12 is therefore moved radially inwardly by the release screw 10 being driven in, the housing part 6 is pushed away from the flange 5 against the spring force of the disk springs 9a, 9b so that the friction-fitting connection between the external freewheel ring 3 and the flange 5 is reduced at the friction coatings 7a, 7b and the external freewheel ring 3 can therefore slip easier in reference to the flange 5.

Figure 6:
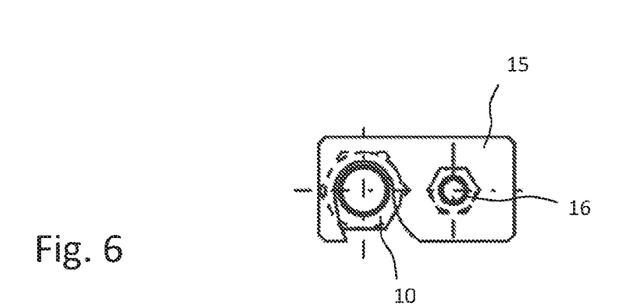

A locking plate 15, which is pushed under the screw head of the safety screw 10 and is held by a safety screw 16, prevents any unintentional and/or forbidden insertion of the release screw 10. For an intentional release of the return stop device the safety screw 16 is released and the locking plate 15 is removed and/or pivoted out from underneath the screw head of the release screw 10. Subsequently the release screw 10 for releasing the return stop device can be driven in. The locking plate 15 and the safety screw 16 are shown in greater detail in the drawing in FIG. 6.

Figure 2:
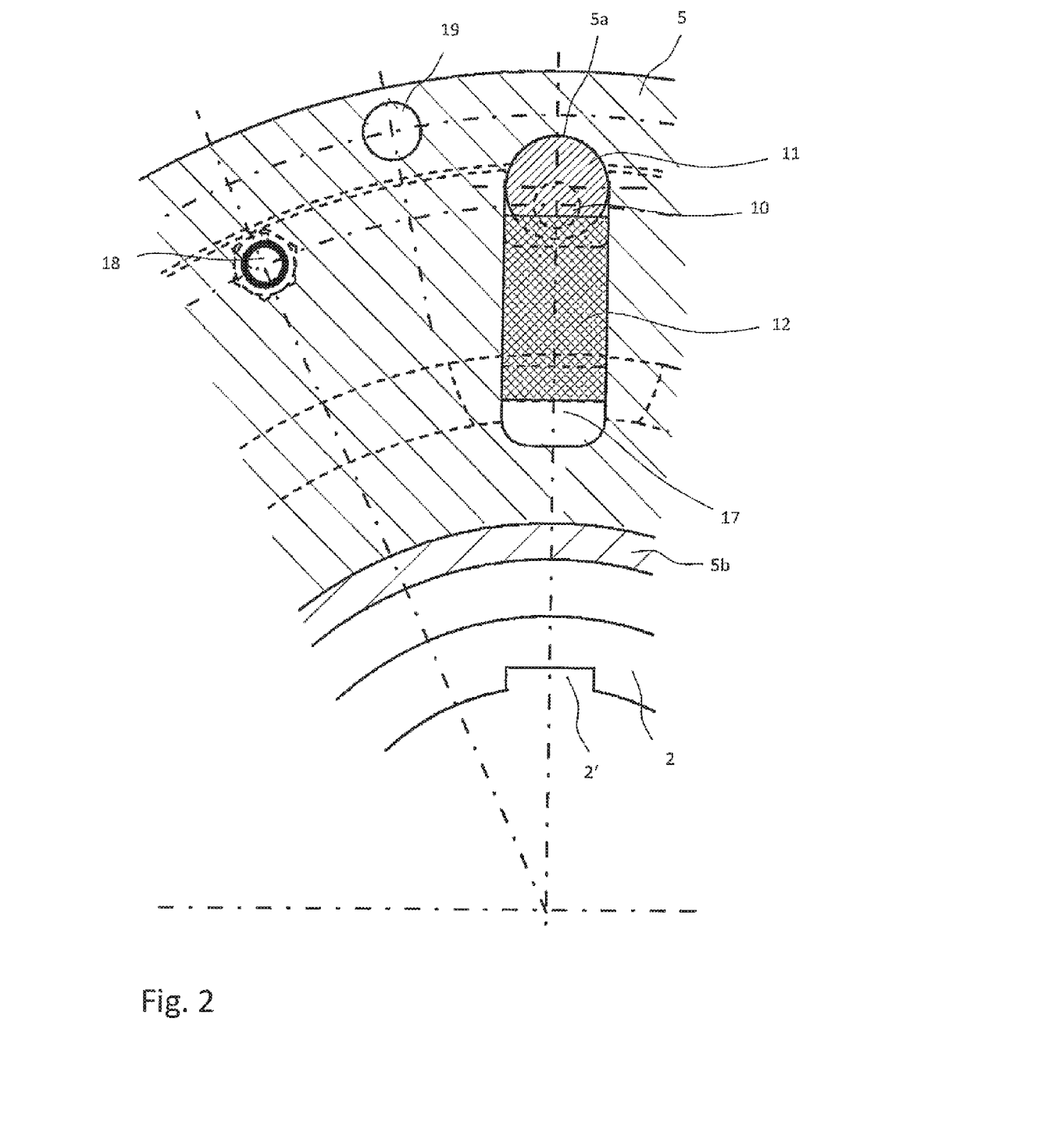

FIG. 2 shows a detail of a return stop device in a cross-section along the line I-I in FIG. 1. In the cross-section shown through the flange 5 an oblong recess 17 is discernible, extending in the radial direction, which serves for accepting the gliding elements 12. Perpendicular in reference to the drawing plane, the bore 5a extends in the upper section of the recess 17, in which the sliding cylinder 11 is arranged in a displaceable fashion with its wedge-shaped thrust surface 13 for the gliding element 12. The contact area of the release screw 10 is shown in dot-dash lines as a hidden contour. In the interior of the annular flange 5 the bearing socket 5b is discernible, as well as the mobile internal freewheel ring 2, arranged rotational in one direction in reference to the external freewheel ring 3, showing a groove 2' to accept a key.

Offset in the circumferential direction in reference to the release screw 10 a connection screw 18 is shown, by which the disk springs 9a, 9b are stressed and the housing part 6 is screwed tightly against the flange 5. Overall, distributed in the circumferential direction, a plurality of such connection screws is provided, with only one being shown for reasons of clarity. Additionally, a penetrating bore 19 is shown in the exterior area of the flange 5. It serves to screw the flange 5 to a conveyer system, for example at the housing of a transmission.

Figure 2A:
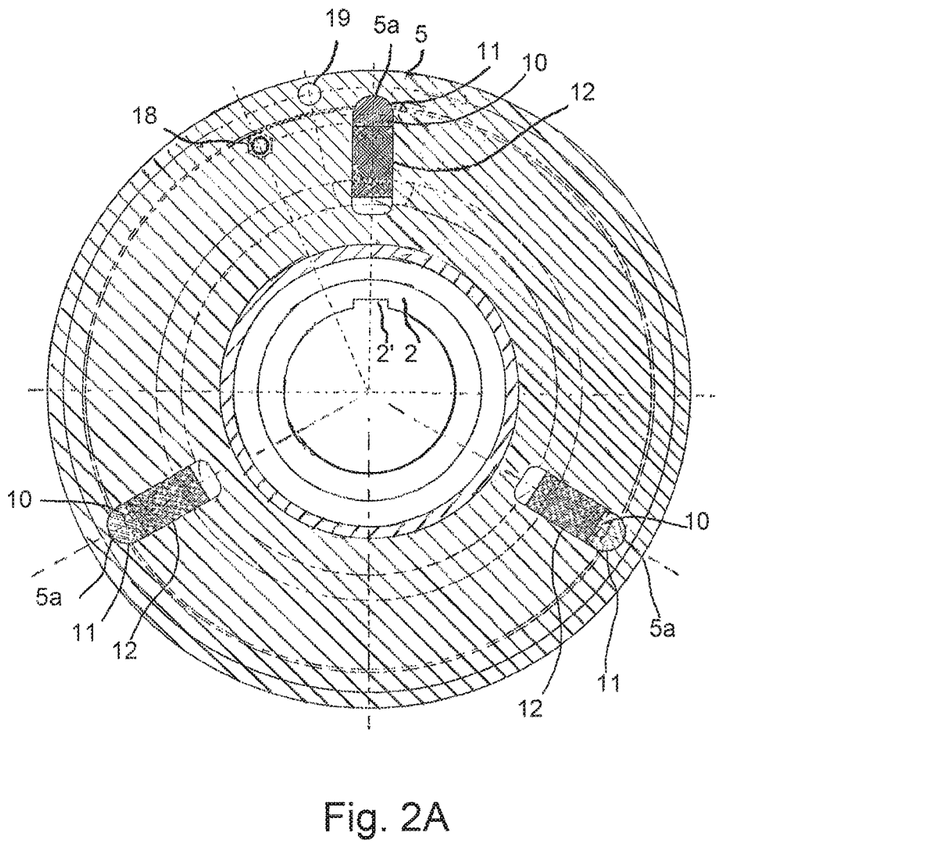

Three or more release devices of the above-described type are arranged distributed in the circumferential direction. The use of three release devices, which are arranged along the circumference offset by 120° is shown schematically in FIG. 2A.

Figure 3:
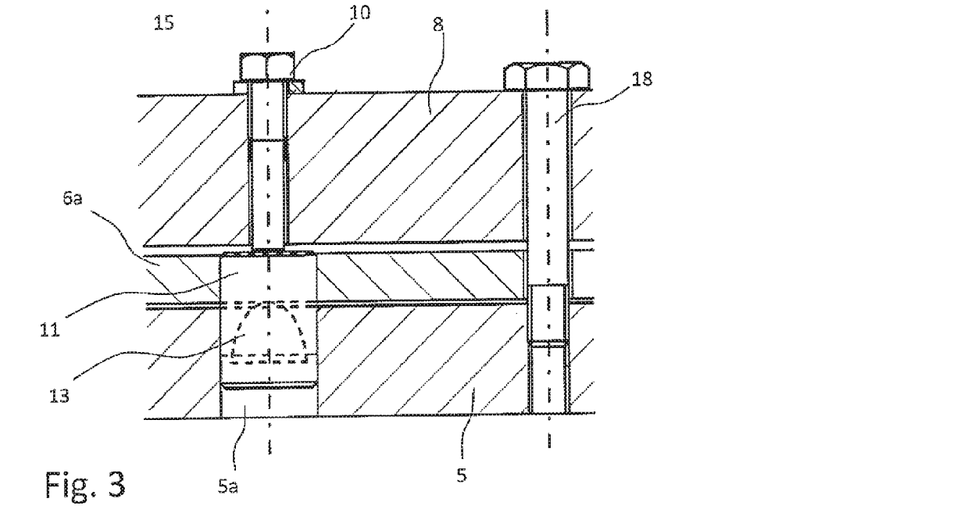

FIG. 3 shows a cross-section along a line III-III in FIG. 1 extending annularly in the circumferential direction. In the area of the release device the cross-sectional line extends with a step at the contact point between the connection screw 10 and the sliding cylinder 11 such that in FIG. 3 they seem centered in reference to each other. The sliding cylinder 11 comprises the above-described milled slot, extending diagonal in reference to its longitudinal axis, which serves as the wedge-shaped thrust surface 13 for the gliding element 12 and causes a first wedge amplification of the release force. The sliding cylinder 11 is arranged in a mobile fashion in a bore 5a of the flange 5. The release screw 10 acts from the top upon the sliding cylinder 11 and displaces it during the driving process into a released position further in the flange 5 if the locking plate 15 had been removed. For this purpose the release screw 10 engages a thread in the cap ring 8.

A connection screw 18 is also shown offset in reference to the release screw 10, with at this point the cross-section is not shown stepped for better clarity. The connection screw 18 extends through respective penetrating bores in the cap ring 8 and the annular attachment 6a of the housing part 6 and is screwed tightly in a threaded bore in the flange 5. By appropriately selecting the tightening torque of the connection screw 18 as well as the other connection screws, not shown, the pre-stressing of the disk springs 9a, 9b located inside the cap ring and thus the contact pressure of the external freewheel ring 3 are adjusted at the respective friction areas 7a, 7b.

Figure 4:
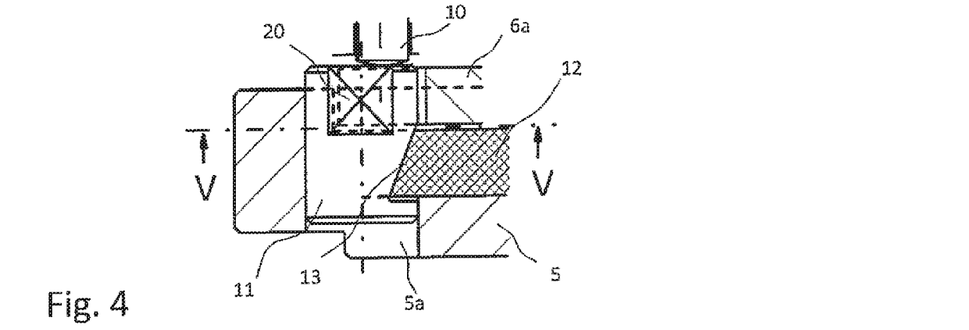

FIG. 4 shows in an illustration of a detail the cooperation of the individual parts of the release device, with the cross-section being equivalent to the one in FIG. 1. The wedge-shaped tapering end of the gliding element 12 engages the diagonally extending milled slot of the sliding cylinder 11 and contacts the wedge-shaped thrust surface 13. At the face the release screw 10 in FIG. 4 acts from the top upon the sliding cylinder 11 and upon activation presses it further into the bore 5a of the flange 5. This way the gliding element 12 is pushed towards the right in FIG. 4 and here presses the flange 5 and the housing part 6 apart from each other. At its end projecting from the top of the flange 5 the sliding cylinder 11 comprises laterally cut areas 20 (shown as a cross-hatched area in FIG. 4), which engage an appropriate recess in the housing part 6 such that the sliding cylinder is secured from rotation.

Figure 5:
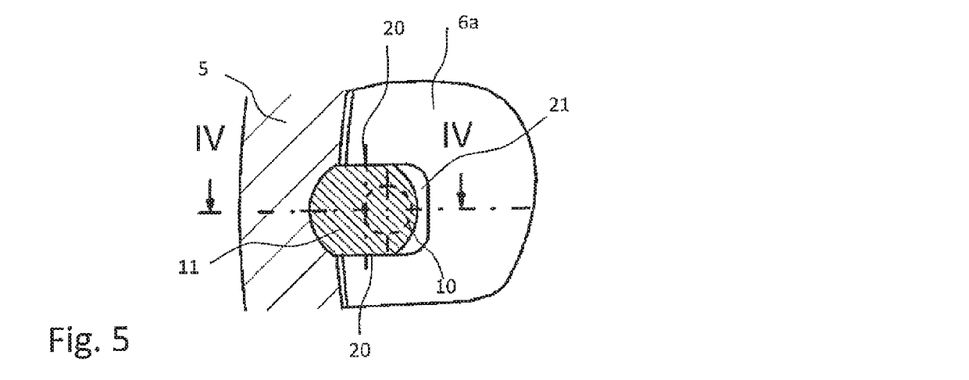

FIG. 5 shows a cross-section along the lines V-V in FIG. 4. Here, in the upper area face milled lateral areas 20 of the sliding cylinder 11 are discernible, which are guided in an appropriate recess 21 in the annular attachment 6a of the housing part 6.

Figure 7:
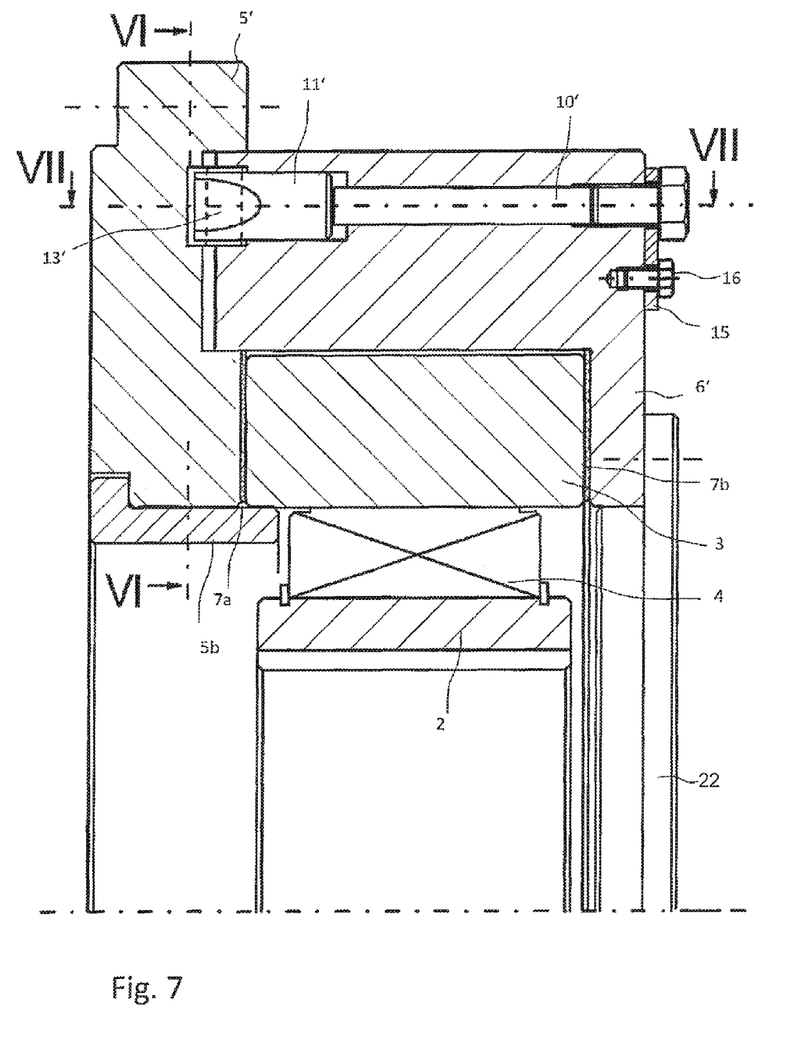
Figure 8:
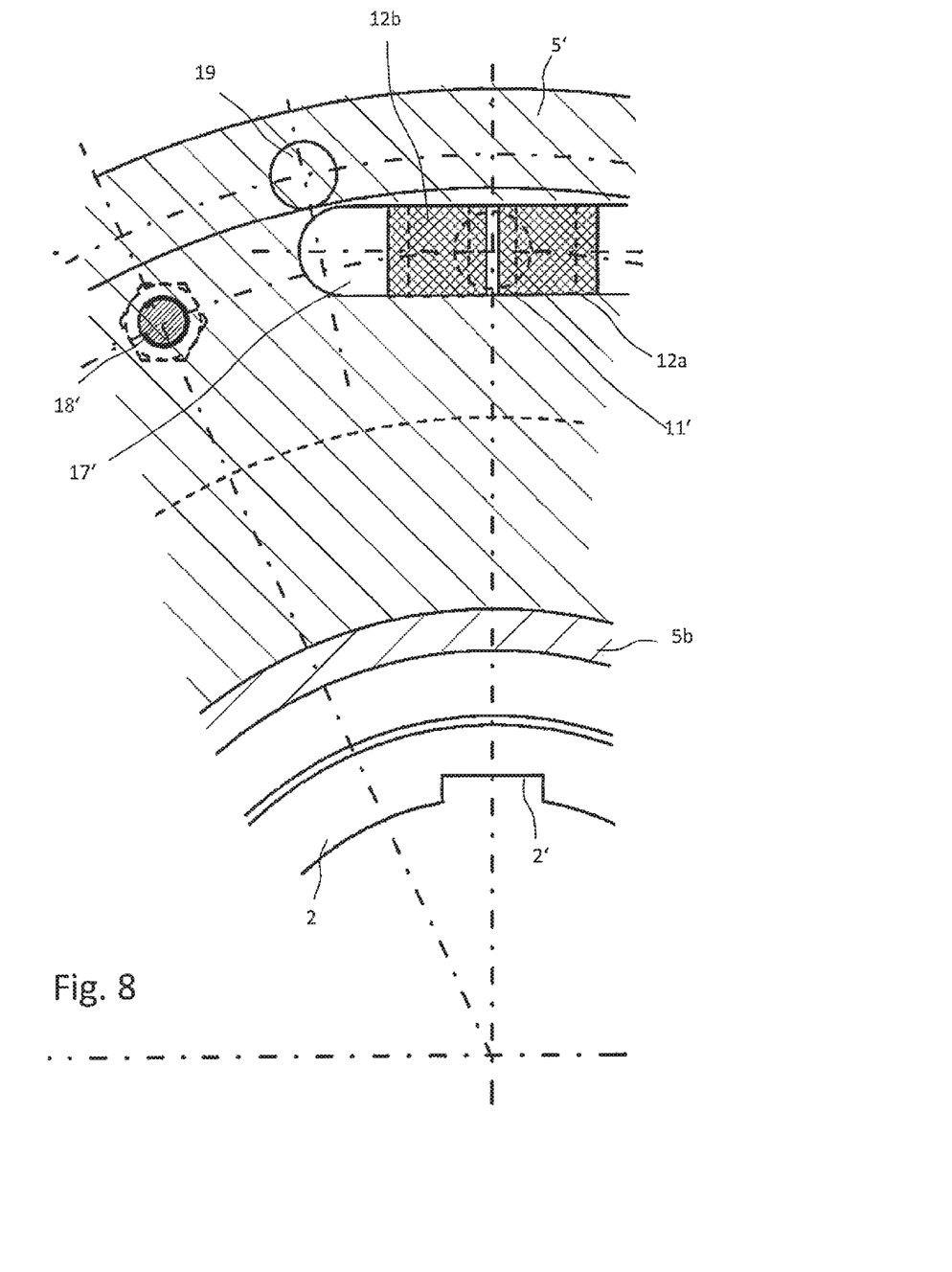
Figure 9:
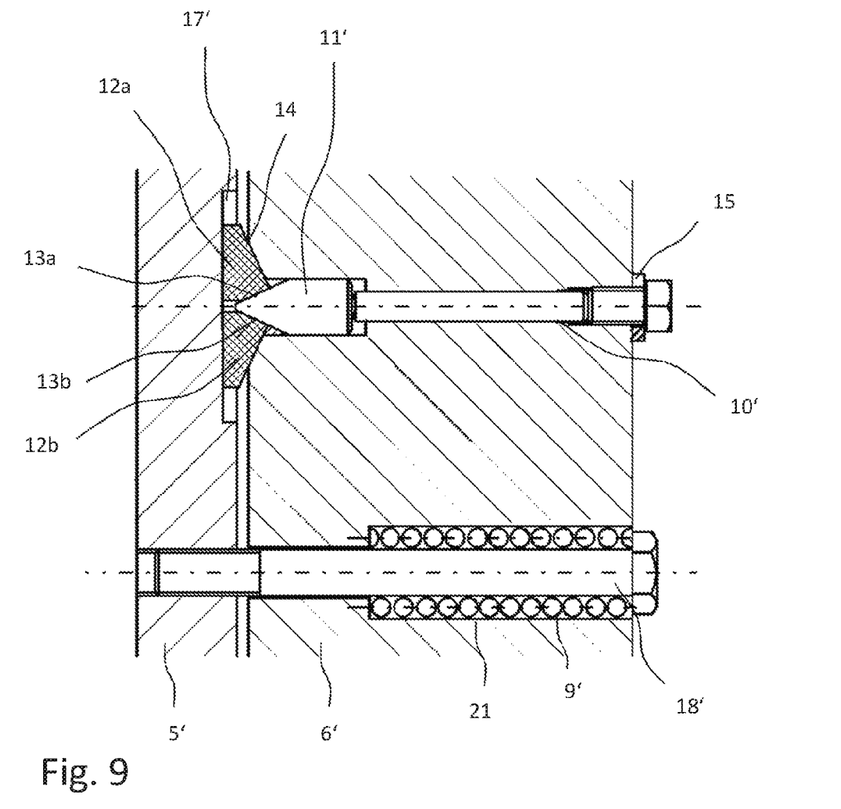

FIGS. 7 to 9 show a second exemplary embodiment of a return stop device. Similar to FIG. 1, FIG. 7 shows here once more the upper half of the return stop device in a longitudinal cross-section. It again includes a freewheel with an internal freewheel ring 2, an external freewheel ring 3, and a plurality of retaining elements 4 arranged between the internal and the external ring. The external freewheel ring 3 is stressed at the face between a flange 5' at the attachment side and a housing part 6'. Similar to the previous exemplary embodiment, friction coatings 7a, 7b are located at the contact areas of the faces of the external ring 3. Contrary to the first exemplary embodiment, the compression force, by which the housing part 6' is held against the flange 5', is here not applied by disk springs but similar to return stop devices of prior art held by a plurality of helical compression springs distributed along the circumference of the housing part 6', which however are not shown in the cross-section illustrated in FIG. 7.

In the second exemplary embodiment the release device comprises a release screw 10', a wedge slider 11', and two gliding elements supported in a displaceable fashion perpendicular in reference to the drawing plane, which are not shown in the cross-sectional illustration of FIG. 7.

The wedge slider 11 exhibits a round cross-section, with the invention not being limited thereto, though, and tapers like a wedge at the lower section pointing towards the flange 5'. Again a locking plate 15 is provided as a safety device, which is held by a safety screw 16 and prevents in the inserted state that the release screw 10' can be driven in.

FIG. 8 shows a cross-section along the line VI-VI in FIG. 7. In this cross-section the two gliding elements 12a, 12b are discernible, which are arranged in a displaceable fashion in an oblong milled slot 17' extending in the tangential direction. The wedge-shaped tapering end of the wedge slider 11' engages a gap between the two gliding elements 12a, 12b and pushes them apart when it is moved by the release screw 10' in the direction towards the flange 5'.

The connection screw 18 arranged in the circumferential direction, which is impinged with the helical compression spring, not shown in FIG. 8, serves to screw the housing part 6' against the flange 5' and here clamps the external freewheel ring 3 between the friction coatings 7a, 7b.

Similar to FIG. 3, FIG. 9 shows a cross-section along the line VII-VII in FIG. 7 extending in the circumferential direction, disclosing the functionality of the release device. When the connection screw 10' is screwed into the housing part 6', it presses upon the cylindrical wedge-slider 11'. The cylindrical wedge-slider 11' comprises two symmetrical wedge areas 13a, 13b, by which it engages a clearance between the two gliding elements 12a, 12b, and pushes them apart. The gliding elements 12a, 12b taper like wedge segments towards the outside and act with their wedge areas 14' against the housing part 6' such that it is lifted in reference to the flange 5' when the gliding elements 12a, 12b are pushed apart.

The connection screw 18', by which the housing part 6' is screwed towards the flange 5', is arranged offset in the circumferential direction. For this purpose, the connection screw 18' extends through a penetrating bore 21, which widens in a step towards the top in order to accept the helical compression spring 9', which is clamped by the connection screw 18'. In this exemplary embodiment therefore, in a manner known per se, the compression force, by which the friction-fitting connection is generated between the external freewheel ring 3 and the flange 5', a plurality of connection screws 18' and corresponding helical compression springs 9' are applied, distributed in the circumferential direction.

Figure 10:
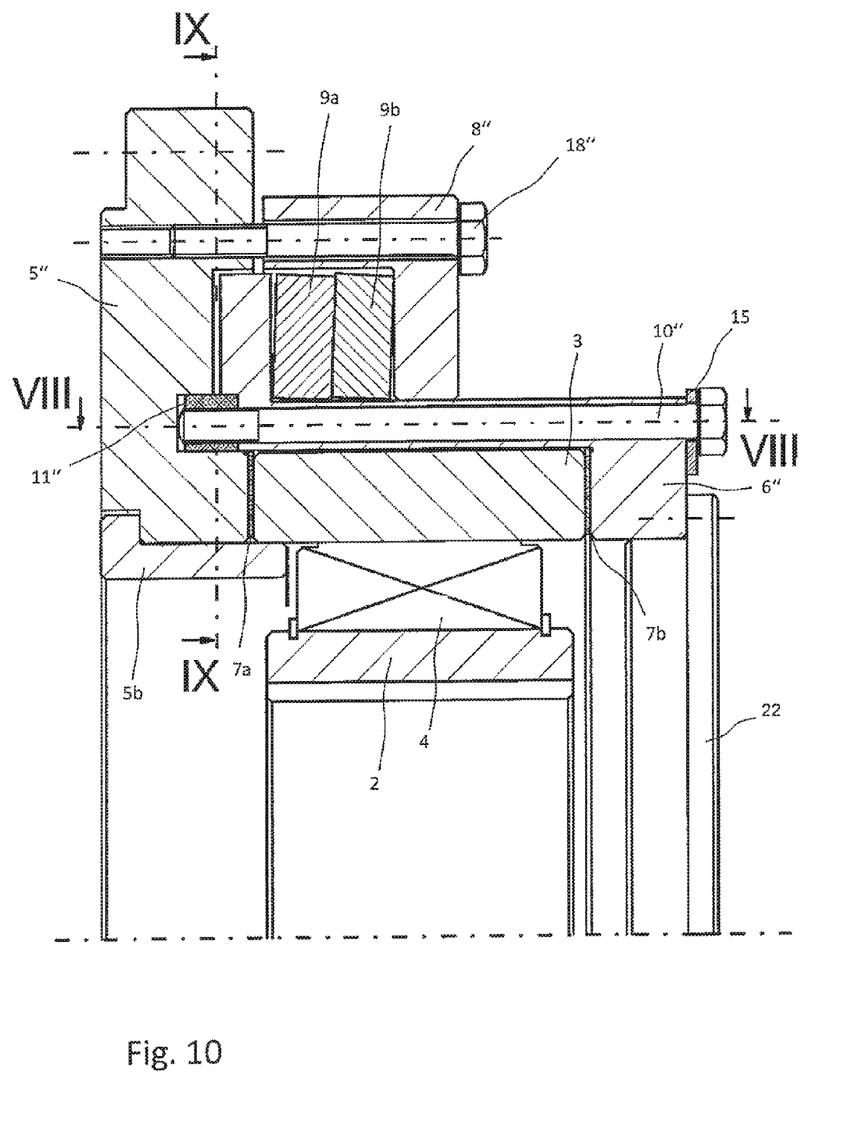
Figure 11:
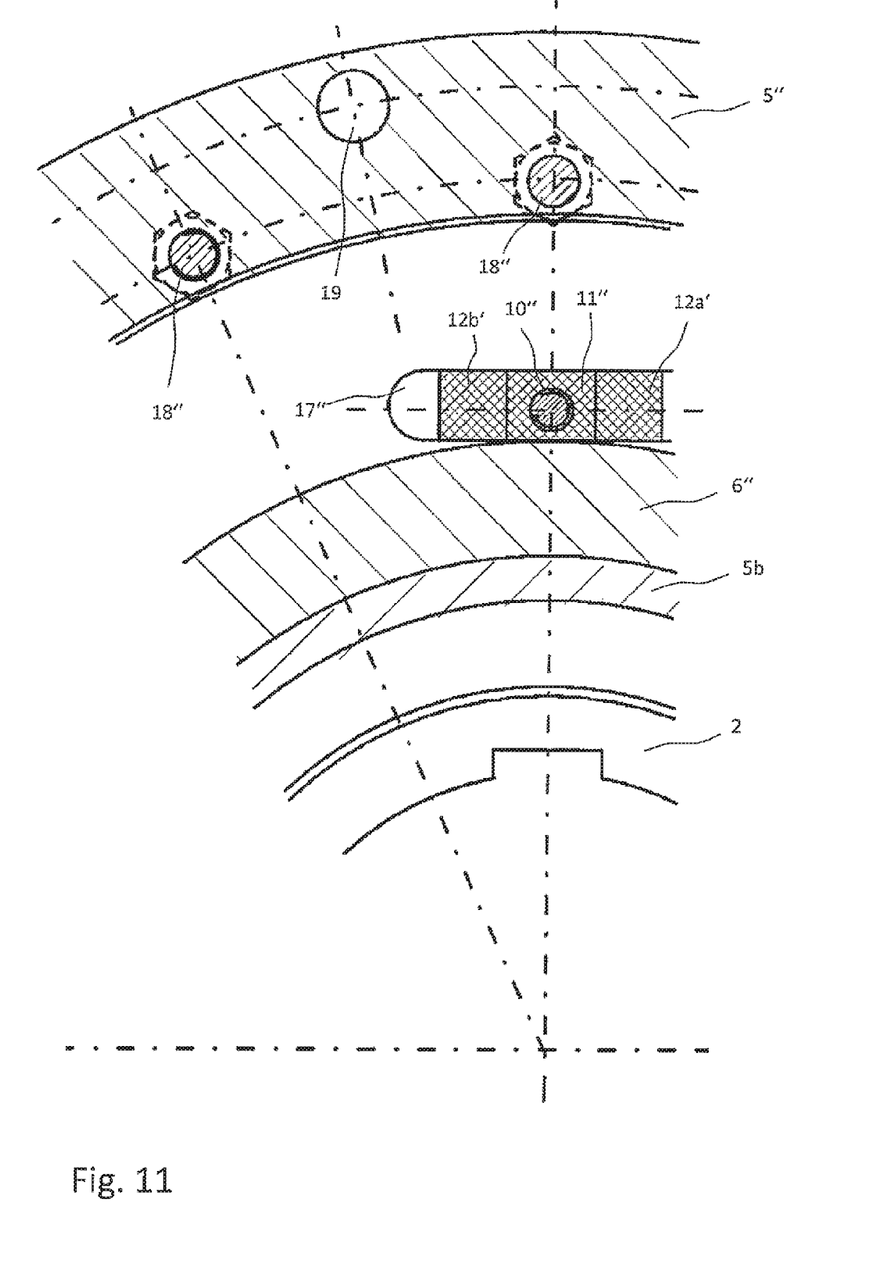
Figure 12:
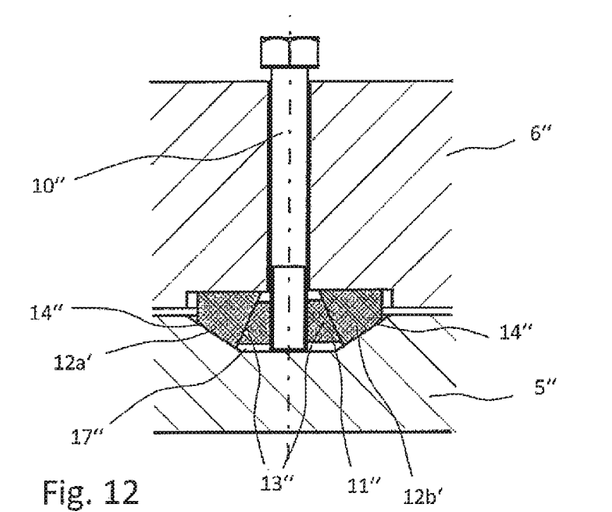

A third exemplary embodiment of a return stop device according to the invention is shown in FIGS. 10, 11, and 12 and/or 13. FIG. 10 shows once more, cross-sectioned in the axial direction, a detail through the upper half of the return stop device. Like in the first exemplary embodiment, here too the housing part 6" and the flange 5" are clamped together via a cap ring 8" and two disk springs 9a, 9b. The disk springs 9a, 9b are here pre-stressed by connection springs 18", distributed in the circumferential direction such that the external freewheel ring 3 of the return stop device is clamped between the torque-proof friction coatings 7a, 7b.

In the third exemplary embodiment a release screw 10" serves as the release device, which is guided through a penetrating bore in the housing part 6" and is screwed at its bottom end, pointing towards the flange side, into a gliding element 11" provided with a threaded bore, which gliding element shows an inverse, wedge-segment shaped design.

From the cross-section along the line IX-IX in FIG. 10, shown in FIG. 11, it is discernible that the gliding element 11" moved by the release screw 10" is arranged between two wedge elements 12a', 12b' arranged in a displaceable fashion and pushes them apart, when by driving the release screw 10" it is pulled in the tensile direction against the two wedge elements 12a', 12b'. The wedge elements 12a', 12b' are arranged in a gliding fashion in a recess 17" milled into the flange 5" in the tangential direction.

FIG. 12 shows a cross-section along the line VIII-VIII in FIG. 10, from which the cooperation of the gliding elements 1", 12a', and 12b' is discernible. The two wedge-segment shaped gliding elements 12a', 12b' are arranged in a bowl-shaped recess 17" with lateral areas ending diagonally towards the outside. The inverse wedge-shaped sliding element 11" shows at both sides symmetrical, wedge-shaped thrust surfaces 13" which act against the gliding elements 12a', 12b'. When the connection screw 10" is driven into a sliding element 11" provided with a threaded bore, it rests with its end on the bottom of the bowl-shaped recess 17" and presses the sliding element 11" upwards in the plane of the drawing, so that the two gliding elements 12a', 12b' are pushed apart and lift the housing part 6" via their wedge areas 14" off the flange 5" against the spring force of the disk springs 9a, 9b.

Figure 13:
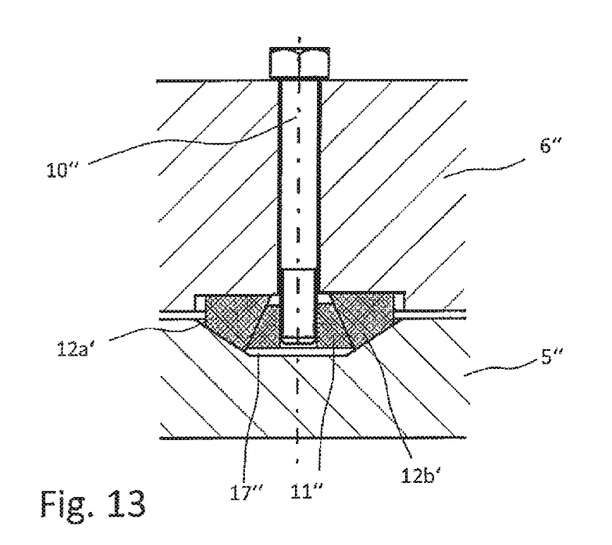

An alternative embodiment is shown in FIG. 13. Here the release screw 10" ends in the threaded bore of the sliding element 11", however rests not towards the bottom on the bowl-shaped recess 17" but acts under tension against the housing part 6".

In the above-described exemplary embodiments the release screw is respectively arranged such that it must be driven into the housing part in a direction parallel to the axis, in order for the first gliding element being displaced with its first wedge area in reference to at least one second gliding element. The gliding element and/or the second gliding elements can here be either arranged displaceable between the flange and the housing part in a radial or a tangential direction.

Similarly it would also be possible to arrange the release screw or another actuating organ acting in the linear direction, for example a hydraulic cylinder, such that it is inserted in a radial direction either into the flange or the housing part. In this case the first gliding element would be moved in a radial direction, in order to displace via respective wedge-shaped thrust surfaces one and/or two second gliding elements in a tangential direction, causing the flange and the housing part to be pressed apart against the contact pressure applied by a clamping device.

It is also possible to embody the first gliding element in the form of a ring located about the flange, which acts via appropriate wedge-shaped thrust surfaces upon several wedge elements distributed radially in the circumferential direction and upon actuating via an appropriate actuation organ pushes them radially inwardly towards the axial center between the flange and the housing part in order to push apart the latter.

It has proven particularly advantageous and thus it is preferred however, as shown in FIGS. 7 to 9 as well as 10 to 12, that here the release screws provided in the housing part rests on the flange and thus supports the axial force of releasing the return stop device acting in the screw.

Furthermore it has proven particularly advantageous for the release screw to be supported spring-loaded in reference to the housing part, for example via disk or helical compression springs, because here a more sensitive return stop device is yielded.

The invention claimed is:

1. A torque-limiting return stop arrangement, comprising an internal ring (2),
an external ring (3) concentric in reference to the internal ring,
retaining elements (4) arranged in an annular gap between the internal and the external ring, to permit a relative rotation between the internal and the external ring (2, 3) in one direction and block rotation in the other direction in a form or friction-fitting fashion,
a flange (5) at an attachment side and a housing part (6) adapted to clamp the external ring (3) therebetween,
a clamping device (8, 9a, 9b) acting in an axial direction, which applies a compression force, by which the external ring (3) is pressed with a face thereof against at least one friction area between the flange (5) and the housing part (6) in order to generate a friction-fitting connection between the flange (5) and the external ring (3),
at least one release device (10, 11, 12) that at least partially overcomes a contact pressure of the clamping device (8, 9a, 9b) in order to reduce or release the friction-fitting connection, the at least one release device comprises an actuating organ (10), which acts upon a first gliding element (11) displaceable in an operating direction, such that the first gliding element (11) acts via a first wedge area (13) upon at least one second gliding element (12), which is arranged displaceable generally perpendicular in reference to an operating direction, and the second gliding element (12) acts via a second wedge area (14) upon the housing part (6) opposite the compression force.

2. The return stop arrangement according to claim 1, wherein the friction area is provided with a friction coating (7*a*, 7*b*).

3. The return stop arrangement according to claim 1, wherein the clamping device comprises at least one disk spring (9*a*, 9*b*) clamped via connection screws, by which the housing part (6) is held against the flange (5), that press the external ring (3) against the flange (5).

4. The return stop arrangement according to claim 3, wherein the disk springs (9*a*, 9*b*) press the housing part (6) via a cap ring (8) against the flange (5).

5. The return stop arrangement according to claim 1, wherein the clamping device comprises a plurality of helical compression springs (9') stressed via connection screws (18'), by which the housing part (6') is held against the flange (5') and presses the external ring (3) against the flange (5').

6. The return stop arrangement according to claim 1, wherein the actuating organ is a release screw (10).

7. The return stop arrangement according to claim 6, wherein the release screw (10) is spring-loaded in reference to the housing part (6).

8. The return stop arrangement according to claim 1, wherein the first gliding element (11') comprises two first wedge areas (13*a*, 13*b*) arranged symmetrically, which act upon two second gliding elements (12*a*, 12*b*) in order to push them apart upon actuation.

9. The return stop arrangement according to claim 8, wherein the first gliding element (11') comprises a symmetrical wedge shape and is pressed by the actuating organ (10') in a direction of pressure between the two second gliding elements (12*a*, 12*b*) in order to push them apart.

10. The return stop arrangement according to claim 8, wherein the first gliding element (11") comprises a symmetrical, inversely wedge-segment shape and is pulled by the actuating organ (10") in a tensile direction against the second gliding elements (12*a'*, 12*b'*) in order to push them apart.

11. The return stop arrangement according to claim 1, wherein three or more of the release devices are arranged at the return stop device distributed in a circumferential direction.

12. The return stop arrangement according to claim 1, further comprising a safety device (15) that is adjusted or removed prior to activating the release device (10).

13. The return stop arrangement according to claim 1, wherein the friction area is provided with a carbon-based friction coating.

14. The return stop arrangement according to claim 1, wherein the clamping device (8, 9*a*, 9*b*) acts in the axial direction and applies the compression force which is adjustable, by which the external ring (3) is pressed with the face thereof against the at least one friction area between the flange (5) and the housing part (6).

\* \* \* \* \*